United States Patent
Lasserre et al.

(10) Patent No.: US 6,851,072 B2
(45) Date of Patent: Feb. 1, 2005

(54) FAULT MANAGEMENT AND RECOVERY BASED ON TASK-ID

(75) Inventors: Serge Lasserre, Grasse-Plascassier (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 09/932,378

(22) Filed: Aug. 17, 2001

(65) Prior Publication Data

US 2002/0062459 A1 May 23, 2002

(30) Foreign Application Priority Data

Aug. 21, 2000 (EP) .............................................. 00402331
Jun. 25, 2001 (EP) .............................................. 01401678

(51) Int. Cl.[7] .............................................. G06F 11/07
(52) U.S. Cl. .................. 714/10; 714/5; 714/9; 718/100
(58) Field of Search ................................. 714/9, 10, 42, 714/43, 44, 5; 718/100

(56) References Cited

U.S. PATENT DOCUMENTS

| 5,463,733 | A | * | 10/1995 | Forman et al. | ................ 714/10 |
|---|---|---|---|---|---|
| 5,487,154 | A | * | 1/1996 | Gunji | ........................... 710/22 |
| 6,219,689 | B1 | * | 4/2001 | Mori | ........................... 718/101 |
| 6,253,225 | B1 | * | 6/2001 | Nakahara et al. | ........... 718/100 |
| 6,389,447 | B1 | * | 5/2002 | Singh | ......................... 718/100 |
| 6,564,311 | B2 | * | 5/2003 | Kakeda et al. | .............. 711/207 |

* cited by examiner

Primary Examiner—Robert Beausoliel
Assistant Examiner—Joseph D Manoskey
(74) Attorney, Agent, or Firm—Robert D. Marshall, Jr.; W. James Brady, III; Frederick J. Telecky, Jr.

(57) ABSTRACT

In accordance with a first embodiment of the invention, there is provided a method of operating a digital system that has a processor and a memory. A plurality of program tasks is executed on the processor (800). The processor requests access to memory in response to executing the tasks (802). Some of these access requests are not directly or not straightforwardly linked with the current program counter (PC); for example, a write transaction going through a write buffer (808). An access error resulting form this type of transaction error is referred to as an imprecise abort. A task-id value is supplied along with the address during a deferred memory access and corresponds to the task-id of the task that initiated the memory access (802). If an error condition that prevents normal completion of the memory transaction is detected (806), then a recovery routine uses the task-id value provided with the memory transaction request to identify which program task requested the transaction (810, 812). The recovery routine can then resolve the problem or kill the identified task.

13 Claims, 8 Drawing Sheets

FAULT MANAGEMENT AND RECOVERY BASED ON TASK-ID

This application claims priority to European Application Ser. No. 00402331.3, filed Aug. 21, 2000 (TI-31366EU) and to European Application Ser. No. 01401678.6, filed Jun. 25, 2001 (TI-32234EU). U.S. patent application Ser. No. 09/932,651, filed Aug. 17, 2001 is incorporated herein by reference.

FIELD OF THE INVENTION

This invention generally relates to microprocessors, and more specifically to improvements in fault management and recovery for memory access circuits and methods.

BACKGROUND

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality that may not be provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command.

A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time, or may process multiple tasks in a simultaneous manner using task scheduling. Task may also be processed in a parallel manner using multi-thread techniques. In any event, when processing tasks, it is generally beneficial to process tasks in some optimal order.

Memory management is typically provided by software-managed tables under the control of the operating system with hardware assistance, such as a translation look-aside buffer (TLB) and hardware table walking logic. System protection is generally based on a trusted operating system (OS) memory management handler.

Access faults are signaled through high priority interrupts or abort signals to the memory management handler when the protection information provided by the memory management tables do not match with the type of access. For example, a memory access in user mode when a memory area (pages) is restricted to access only in super-user mode, or a write access to a read access only area, etc.

The memory management tables are also used by more sophisticated operating system for address translation. Applications run in virtual memory space while their memory accesses are done to physical memory after address translation. In these systems, access to non-existent physical memory is possible due to an error in the management of the memory management tables or corruption of those tables. In multi-processor systems, access to memory may be protected by additional security mechanisms that also may cause external aborts.

Current systems do not have or keep information regarding task identification during memory access fault exception processing. The fault address, of course, is the address of the access and is not always directly linked to the program counter (PC) and recovery is very difficult in those cases. It takes time to trace back to the source of the error, potentially impacting real time performance of the system when this abort type masks other interrupts, such as a real-time interrupt, for example. In some systems, the fault address and the type of fault are indicated to help the abort handler recover after an access error whenever possible. But in many systems, the application just hangs or, even worse, stops the full system.

Thus, improvements are needed in fault management and recovery for memory access errors.

SUMMARY OF THE INVENTION

Particular and preferred aspects of the invention are set out in the accompanying independent and dependent claims. In accordance with a first embodiment of the invention, there is provided a method of operating a digital system that has a processor and a memory. A plurality of program tasks is executed on the processor. A task-id value is supplied along with the address during a deferred memory access and corresponds to the task-id of the task that initiated the memory access. If an error condition that prevents normal completion of the memory transaction is detected, then a recovery routine uses the task-id value provided with the memory transaction request to identify which program task requested the transaction. The recovery routine can then resolve the problem or kill the identified task.

In another embodiment, a digital system is provided that has a processor for executing program tasks with an address output port connected to a memory circuit. The address port provides transaction addresses for memory transactions. Identifier circuitry is connected to the processor for holding an identifier value indicative of a program task being executed. Abort circuitry is connected to the identifier circuitry and to the address output port. The abort circuitry is operable to store a fault address provided on the address output port and an identifier value corresponding to the fault address in response to a memory transaction error. The processor is connected to the abort circuitry so that the processor can read the stored fault address and the stored identifier value.

BRIEF DESCRIPTION OF THE DRAWINGS

Particular embodiments in accordance with the invention will now be described, by way of example only, and with reference to the accompanying drawings in which like reference signs are used to denote like parts and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
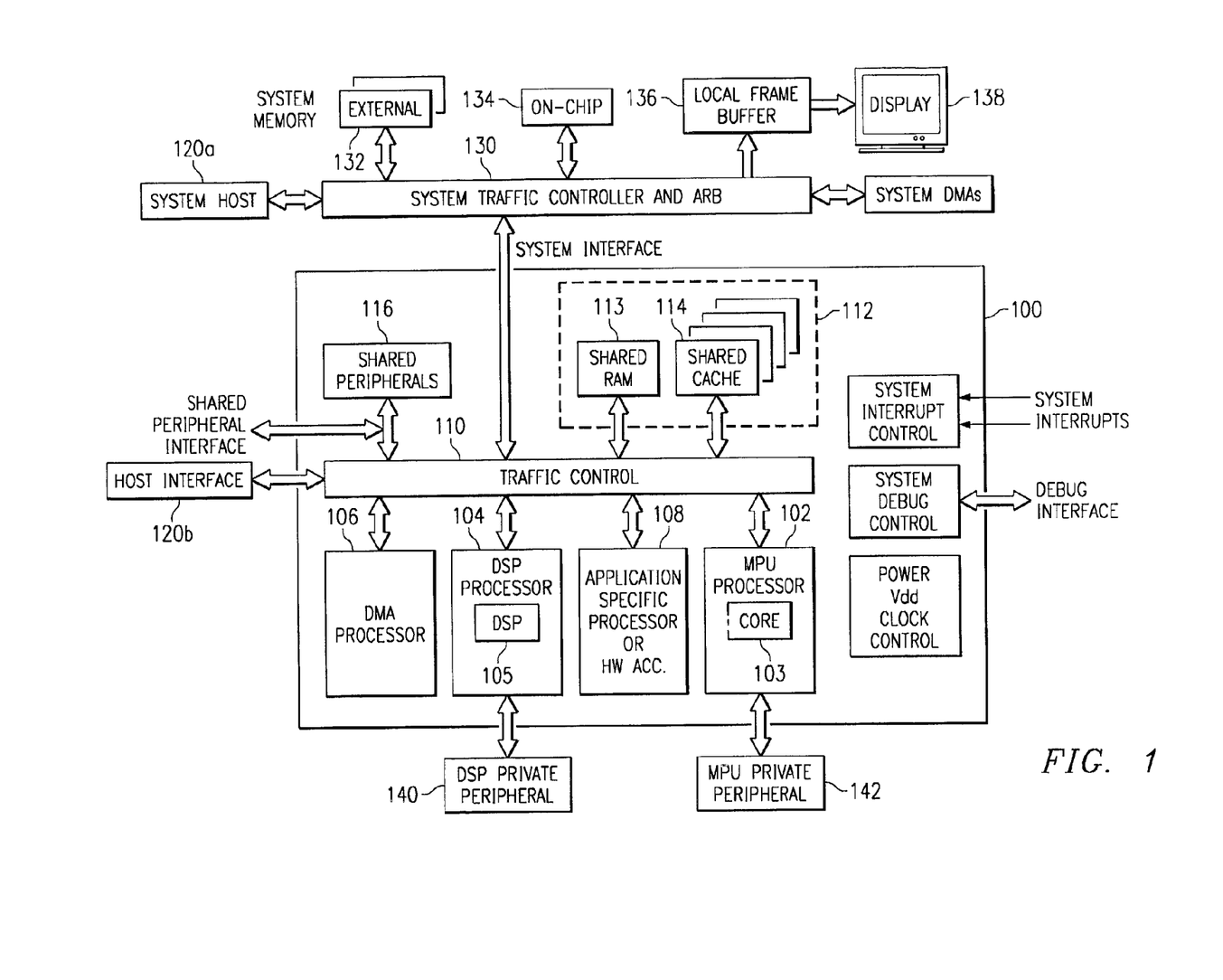
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
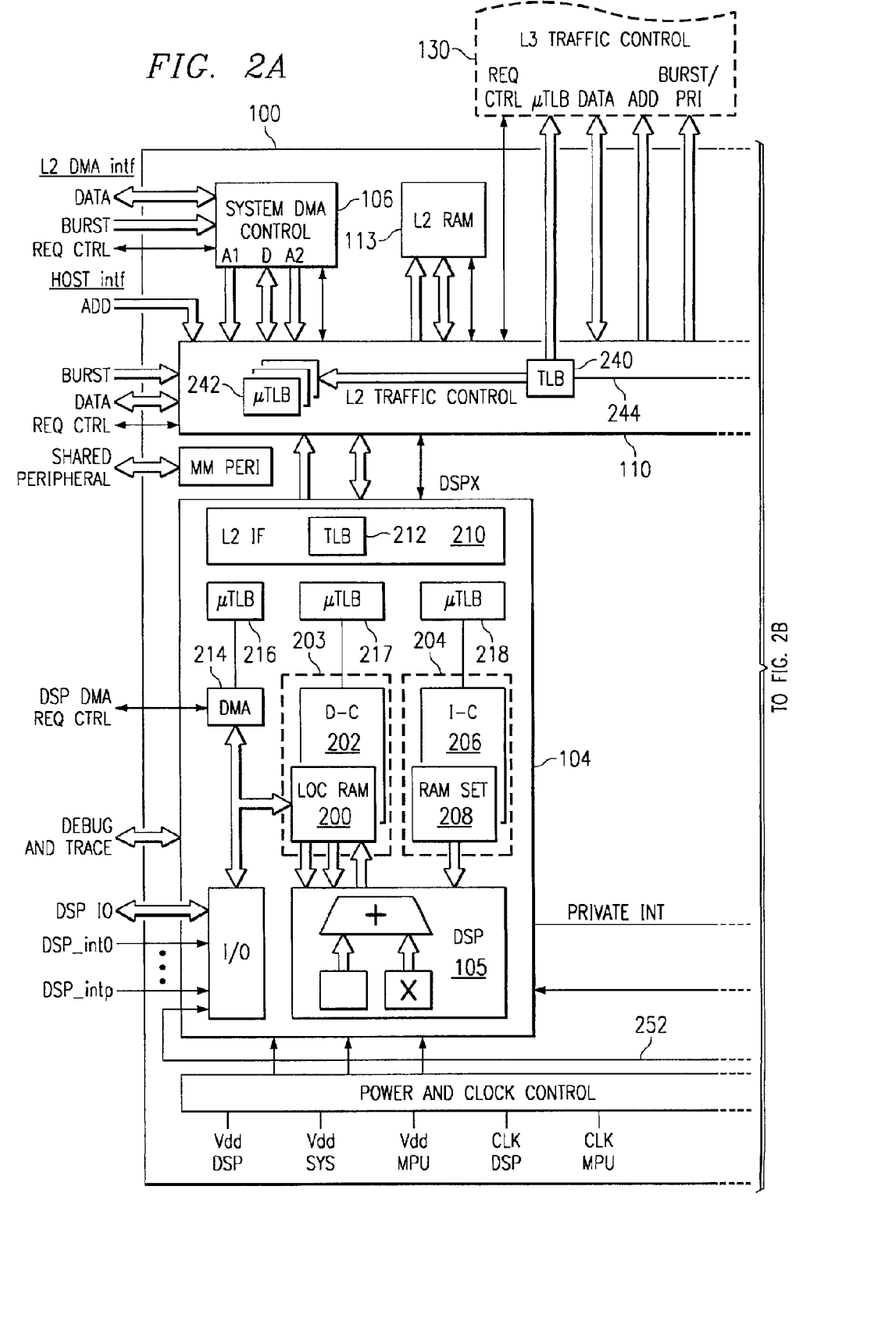
FIGS. 2A and 2B together is a more detailed block diagram of the megacell core of FIG. 1.
Figure 2B:
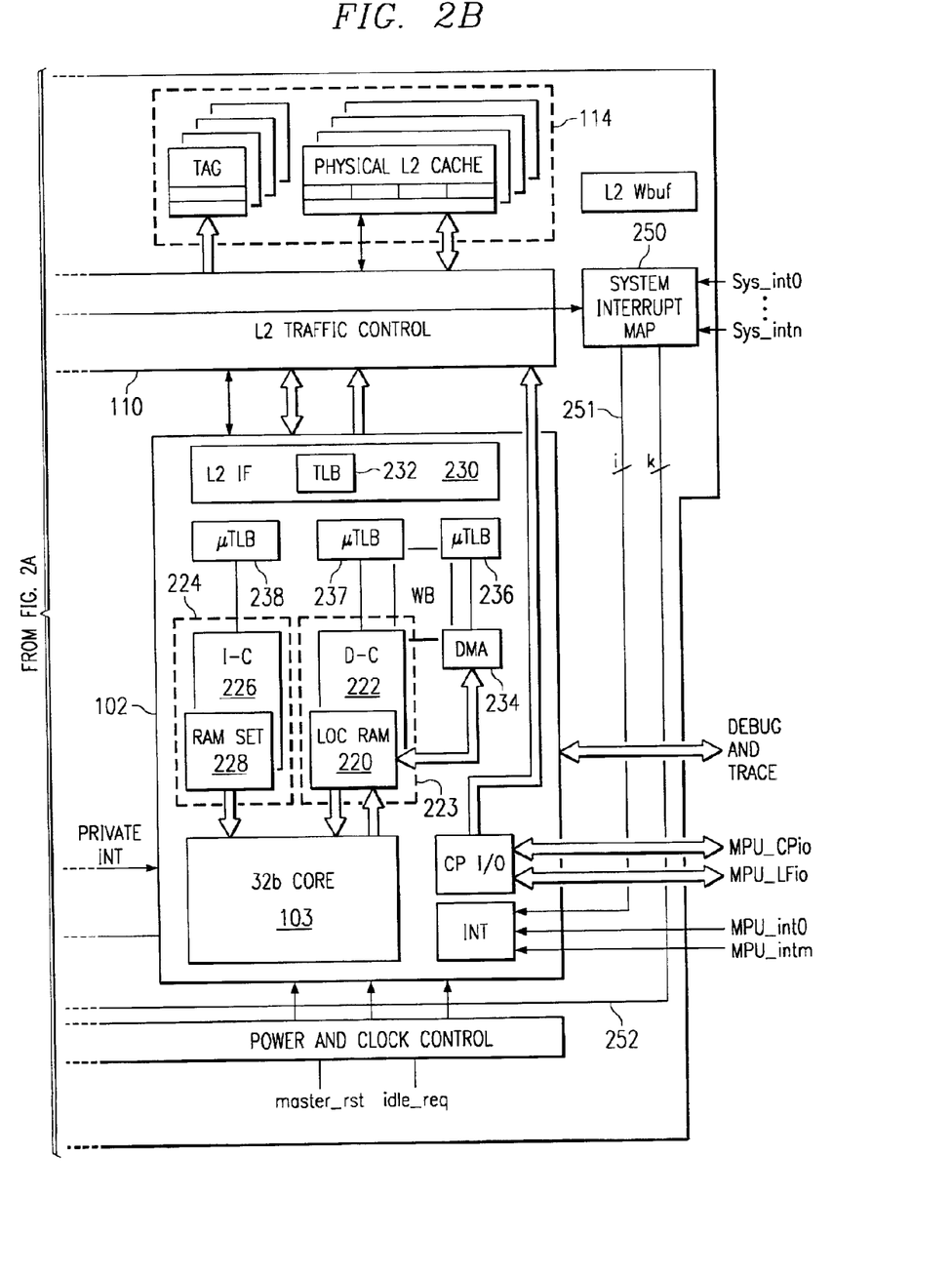

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs ($\mu$TLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs ($\mu$TLB) 236–238 are associated with the DMA circuit, data cache and instruction cache, respectively.

L2 traffic controller 110 includes a TLB 240 and one or more micro-TLB ($\mu$TLB) 242 that are associated with system DMA block 106, host processor interface 120b for a host connected at level two, and other application specific hardware accelerator blocks. Similarly, L3 traffic controller 130 includes a $\mu$TLB controllably connected to TLB 240 that is associated with system host 120a at level three. This $\mu$TLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation lookaside buffer (TLB) caches contain entries for virtual-to-physical address translation and page descriptor information such as access permission checking, cache policy for various levels, etc. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, an exception is generated that initiates a translation table walk software routine. The TLB miss software handler retrieves the translation and access permission information from a translation table in physical memory. Once retrieved, the page or section descriptor is stored into the TLB at a selected victim location. Victim location selection is done by software or with hardware support.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

An address reference is generally located within the μTLB or main TLB of each processor sub-system; however, certain references, such as those used by system DMA 106 or host processor 120, for example, to access megacell memories can be distributed within L2 traffic controller 110 and cached into L2 system shared TLB 240 Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/μTLB corresponding to a selected task.

All megacell memory accesses are protected by a TLB. As they all have different requirements in term of access frequencies and memory size, a shared TLB with individual μTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

MMU/TLB Control Operation

Figure 3:
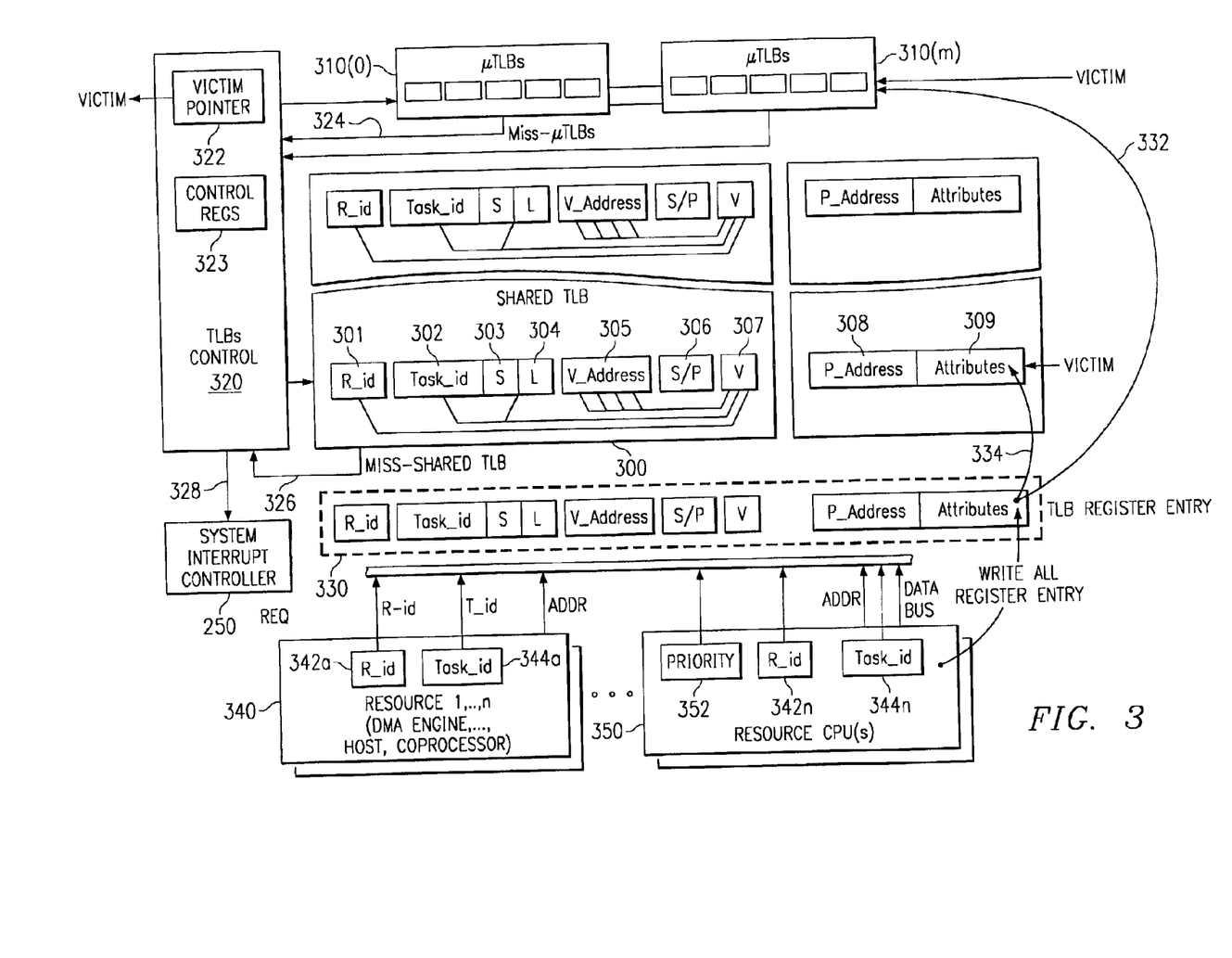
FIG. 3 is a block diagram illustrating a shared translation lookaside buffer (TLB) and several associated micro-TLBs ($\mu$TLB) included in the megacell of FIG. 2.

FIG. 3 is a block diagram illustrating a shared translation look-aside buffer (TLB) 300 and several associated micro-TLBs (μTLB) 310(0)–310(n) included in megacell 100 of FIG. 2. On a μTLB miss, the shared TLB is first searched. TLB controller 320 is alerted by asserting a μTLB miss signal 324. In case of a hit on the shared TLB, the μTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor who's OS supervises the resource that caused the miss. A TLB entry register 330 associated with TLB controller 320 is loaded by a software TLB handler in response to the interrupt. Once loaded, the contents of TLB entry register 330 are transferred to both shared TLB 300 and the requesting μTLB at a selected victim location as indicated by arcs 332 and 334.

Each entry in a TLB has a resource identifier 301 along with task-ID 302. Resource-IDs and task IDs are not extension fields of the virtual address (VA) but simply address qualifiers. Resource IDs are provided by a resource-ID register associated with each resource; such as R-ID register 342a associated with resource 340 and R-ID register 342n associated with resource 350. Resource 340 is representative of various DMA engines, coprocessor, etc within megacell 100 and/or an external host connected to megacell 100. Resource 350 is representative of various processors within megacell 100. Each resource 340, 350 typically has its own associated R-ID register; however, various embodiments may choose to provide resource ID registers for only a selected portion of the resources. A task ID is provided by a task-ID register, such as task-ID register 344a associated with resource 340 and task-ID register 344n associated with resource 350. A task register associated with a non-processor resource, such as DMA, a coprocessor, etc, is loaded with a task value to indicate the task that it is supporting. Similarly, R-ID on a non-processor resource can be the same as the R-ID of the processor that controls it.

In another embodiment, only processor resources 340, 350 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task-ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value. In other embodiments, a different default value may be used. In other embodiments, R-ID "registers" provide hardwired values.

Referring still to FIG. 3, each TLB entry includes a virtual address field 305 and a corresponding physical address field 308 and address attributes 309. Address attributes define conditions or states that apply to an entire section or page of the address space that is represented by a given TLB entry. An S/P field 306 specifies a page size. Each TLB entry also includes "shared" bit 303 and a lock bit 304. All entries marked as shared can be flushed in one cycle globally.

A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable the compare logic with their associated field.

As mentioned earlier, the resource ID field and task ID field in each entry of the TLB/μTLB can be used to improve security. During program task execution, each transaction request is checked by the miss control circuitry of the TLB/μTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Figure 4:
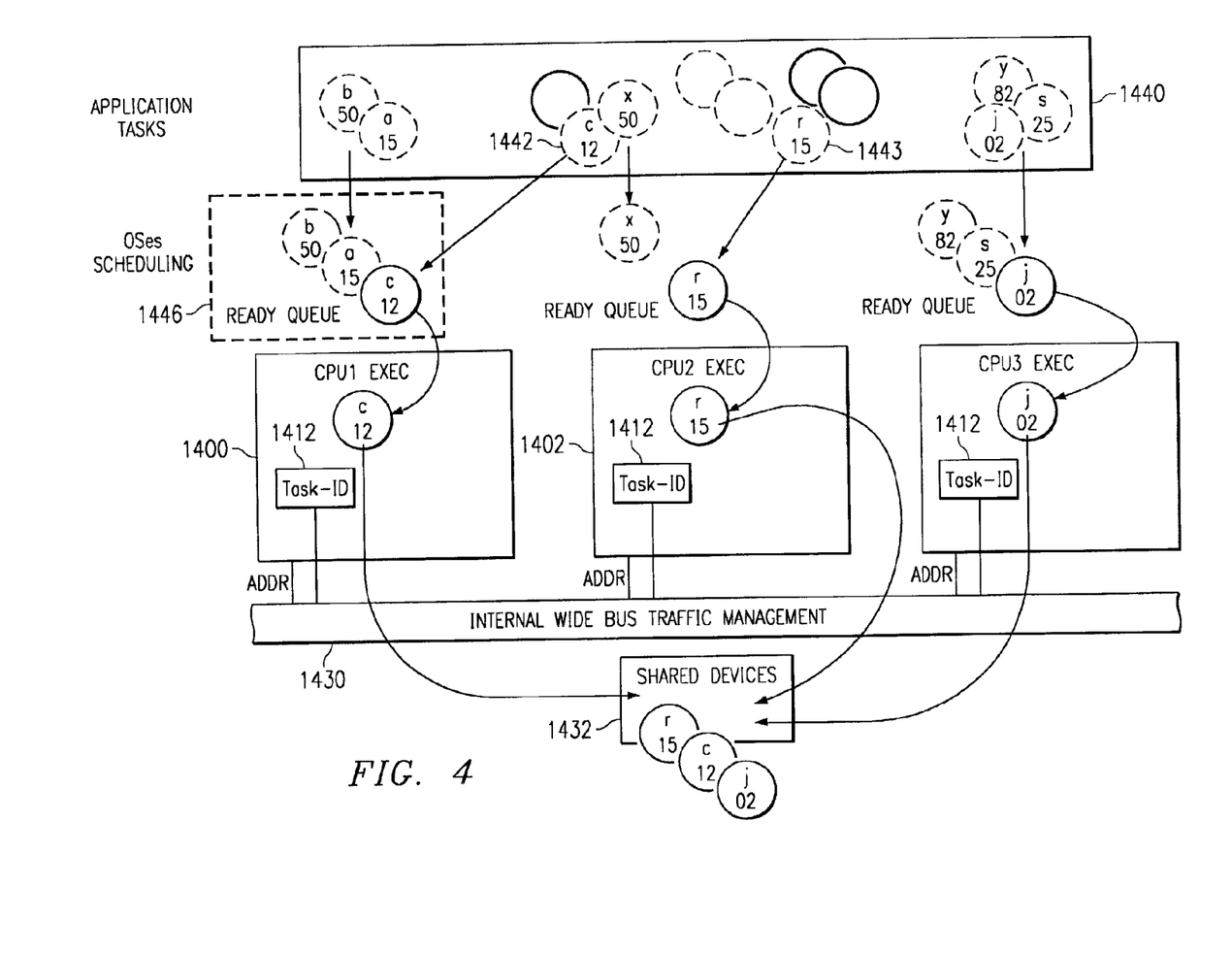
FIG. 4 is a block diagram of a digital system similar to FIG. 1 illustrating a cloud of tasks that are scheduled for execution on the various processors of the digital system.

FIG. 4 is a block diagram of a digital system similar to that of FIG. 1 illustrating cloud of tasks that are scheduled for execution on the various processors of the digital system. Typically, each software task includes a task priority value that is commonly used by an operating system to schedule an order of execution for a set of pending tasks 1440.

In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. The Task ID register in each processor is loaded when a task is invoked.

Table 1 illustrates several portions of instruction code sequences in which a task is spawned. From line 1 to line 5, task "c" is active and spawns a new task, "audio" on line 5. The kernel is then invoked to instantiate the new task and create the associated TCB. An eight bit (numbers of bits can be more or less) task-ID field is memorized in the TCB at line 11. During the context switch (reschedule in line 13) before launching the "audio" task, the kernel loads task-ID register 1412 with the task-ID value held in the TCB (Table 2) or in another table. At line 14, the new task is now active.

TABLE 1

Setting Task ID at the Start of a Task

| | |
|---|---|
| 1 | // (Task c code execution) |
| 2 | Instruction 1 |
| 3 | ------ |
| 4 | instruction n |
| 5 | Taskspawn("audio",200,0,5000,(FUNCPTR)audio,// (Task ccode execution: instruction n+2) |
| 6 | //(Kernel code execution) |
| 7 | ----- |
| 8 | TaskCreate() |
| 9 | //(taskcreate code execution) |
| 10 | ------ |
| 11 | SetTaskAttributeID(TID) |
| 12 | ------- |
| 13 | // Kernel reschedule code execution |
| 14 | //(Task Audio code execution) |
| 15 | Instruction 1 |
| 16 | ------- |

Table 2 is an example task control block that is used to define a task-ID. Typically, the OS uses a 32-bit task-ID that is in fact an address that enables the OS to locate task information (TCB). At line 4, an execution priority value is defined that is used by the operating system to schedule execution of the task. At line 5, a task-ID value is defined that is used to set the task ID register when the task is instantiated.

TABLE 2

Setting Task ID Using a TCB

| | |
|---|---|
| 1 | TCB (task control block) |
| 2 | Typedef struct TCB |
| 3 | { |
| 4 | UINT OS-priority |
| 5 | UINT Task_ID |
| 6 | --- |
| 7 | #if CPU_FAMILY == xx |
| 8 | EXC_INFO excinfo; |
| 9 | REG_SET regs; |
| 10 | . . . |
| 11 | #endif |
| 12 | } |

In other embodiments, other means than a TCB may be provided for storing the task ID.

Figure 5:
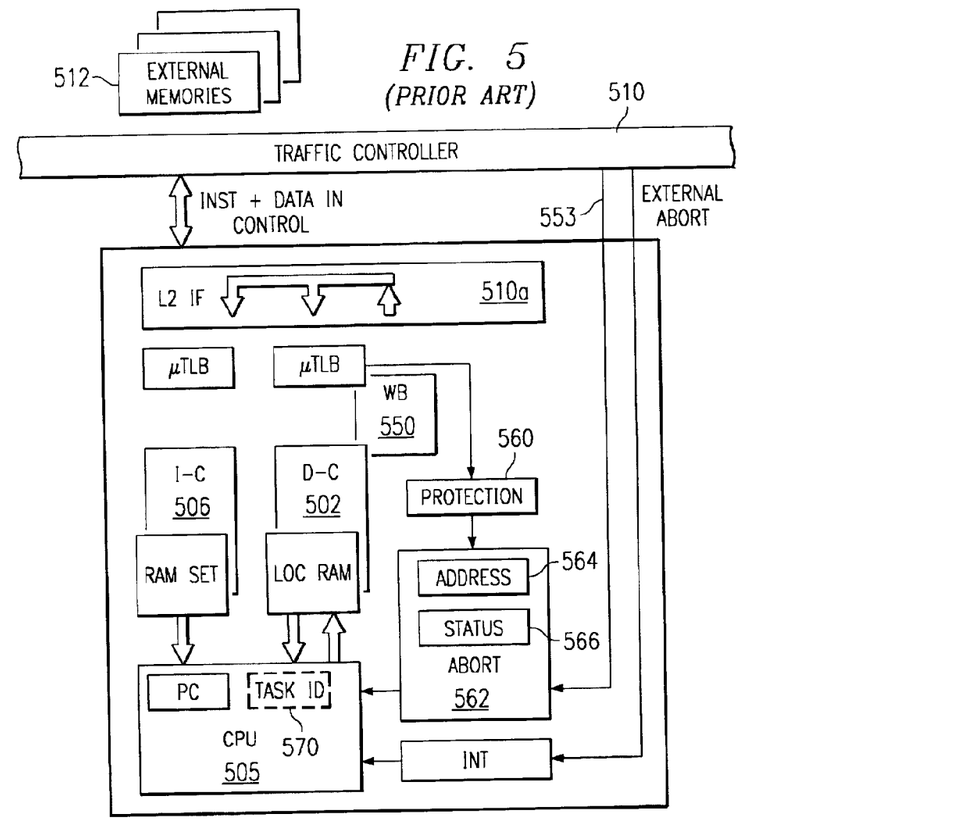
FIG. 5 is a block diagram of a prior art digital system illustrating a common error reporting technique.

FIG. 5 is a block diagram of a prior art digital system illustrating a common error reporting technique. The system is similar to the system of FIG. 1 and has a CPU 505 with an instruction cache 506 and data cache 502 and additional local memory RAM. Memory requests to external memory 512 pass through level 2 interface 510a and traffic controller 510. When data is cleaned from data cashe 502, write buffer 550 is used to queue write requests to external memory 512. Task-ID information 570 is maintained within processor 505 and is used by the operating system to schedule task execution.

Access faults to memory 512 are signaled through a high priority interrupt signal or an abort signal from abort circuitry 562 to a memory management handler when the protection information provided by the memory management tables do not match with the type of access. Similarly, access to non-existent physical memory due to error in the management of these tables or corruption of those tables is reported via external abort signal 553. In multi-processor systems access to memory protected by additional security mechanism also could cause external aborts. Abort circuitry 562 collects a copy of the fault address 64 and status information 566 that describes the type of access and error.

These external aborts can be of two types: precise or imprecise. Precise means that the current PC address can easily be recovered to correct the error and start the application if necessary where it fails. Imprecise means that the program cannot be re-started where it fails because the PC address has been lost. The fault address is the address of the faulty access and is not always directly linked to the program counter (PC) and recovery is very difficult in those cases. All write accesses through the write buffer generate an imprecise abort in case of fault.

Figure 6:
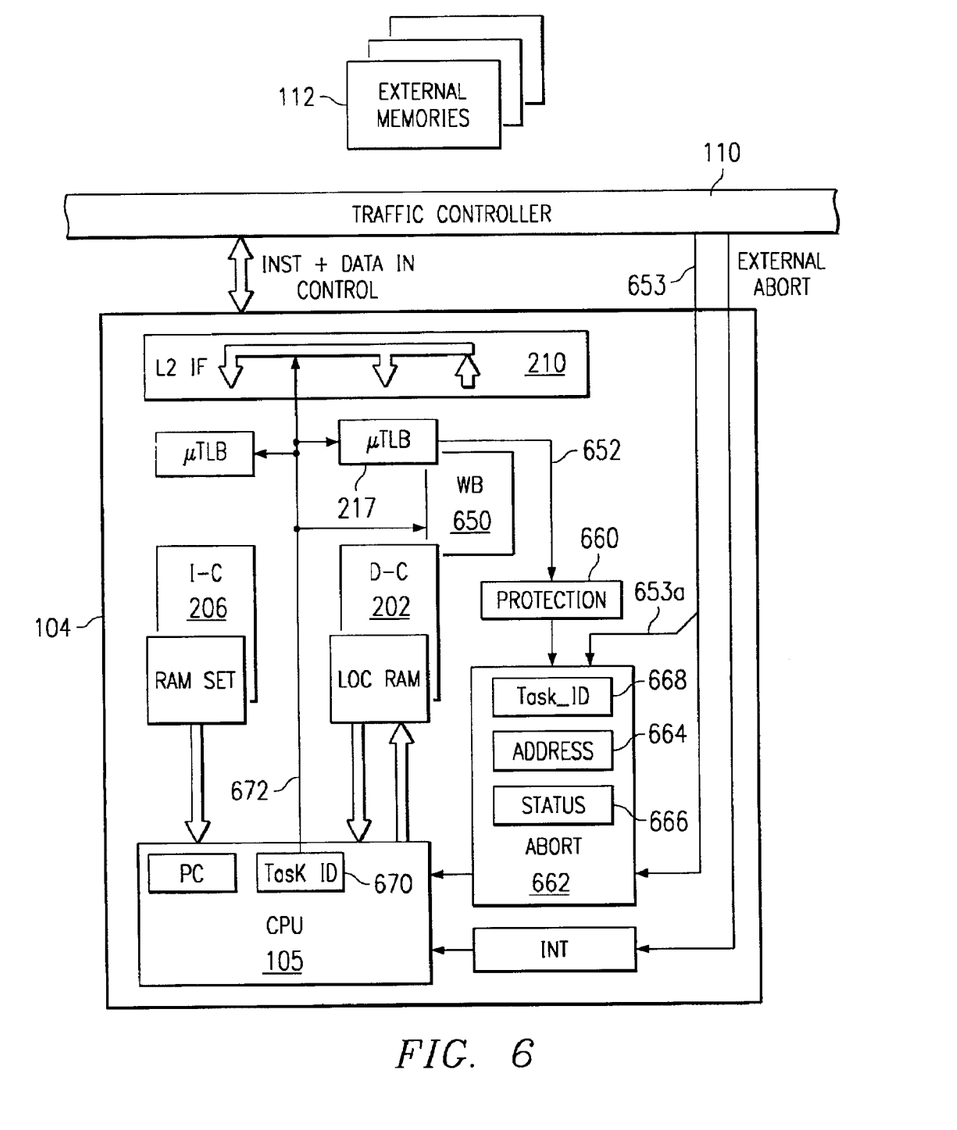
FIG. 6 is a more detailed block diagram of a portion of the digital system of FIG. 2 that illustrates using task-ID information for improved fault management and recovery from memory access errors.

FIG. 6 is a more detailed block diagram of a portion of the digital system of FIG. 2 that illustrates the usage of task-ID information for improved fault management and recovery from memory access errors. As described previously, CPU 105 has an instruction cache 206 and data cache 202 and additional local memory RAM. Memory requests to external memory 112 pass through level 2 interface 210 and traffic controller 110. When data is cleaned from data cache 202 write buffer 650 is used to queue write requests to external memory 112. Task-ID information 670 is maintained within processor 105 and is updated by the operating system during context switch prior to a task execution. The task-ID information is also provided by task-ID register 670 to interface circuitry 210 and thence to traffic controller 110, μTLB 217, and write buffer 650 along with each memory request via signals 672.

Access faults to memory 112 are signaled through a high priority interrupt signal or an abort signal from abort circuitry 662 to a memory management handler when the protection information provided by the memory management tables do not match with the type of access, in response to protection circuitry 660. Similarly, access to non-existent physical memory due to error in the management of these tables or corruption of those tables is reported via external abort signal 653. Abort circuitry 662 collects a copy of a fault address 664, status information 666 that describes the type of access and error, and task-ID information 668. The status information is provided by protection circuitry 660 for errors that are discovered within subsystem 104 by the TLB circuitry by analyzing the MMU table contents or TLB contents 652 and by abort signals 653a for errors that are detected by traffic controller 110. The task-ID and address are taken from the task-ID register 670 and address bus coming from the core for faults detected by the protection unit and for a precise external abort.

As described earlier, each memory accessing resource in the system has an associated task-ID register. In this embodiment, CPU 105 has an 8-bit task-ID 670 with CPU core 105. Another embodiment may have a task-ID register located in elsewhere in DSP subsystem 104. In either case, the task-id information is provided at the same time as the access address for memory access requests. During each CPU memory access, the task-ID qualifies the address. If for some reasons the imprecise external access is aborted because the address is wrong and does not correspond to the memory available on the system or because the system has additional protection mechanism at the system level, then an abort is asserted via external abort signal 653. In this case, abort signals 653a provide the task-ID, fault address and transaction type to abort registers 668, 664, and 666.

When the access is a delayed write through write buffer 650, the task-id is queued in the write buffer along with the address until the memory access is performed. Consequently, when the buffered write is posted to μTLB 217 and then to traffic controller 110, the task-id value is coherent with the access address. This task-id value can be different from the task-id of the current active process when the write is actually presented to the external memory.

In another embodiment, the task-id 670 is maintained coherent with the contents of the write buffer. In that case, the task-id does not need to be stored with the address in the write buffer reducing its size but the write buffer need to be emptied before changing the value of the task-id register 670 during the context switch. In that case the task-id value is always provided by the register 670.

As described earlier, these aborts can be of two types: precise or imprecise. All write accesses through the write buffer generate an imprecise abort in case of fault. The fault address is the address of the access and is not always directly linked to the PC. A software routine "abort handler" identifies the type of the abort by reading abort status register 666. Another embodiment may provide a different abort signal for each type. In the case of an imprecise external abort, the abort handler can immediately identify the task by reading aborted-task-id register 668 located in abort hardware block 662. Advantageously, this allows the operating system to kill a faulty application very rapidly without impacting so much the other tasks and in particular real time tasks.

DMA transfers are also associated with a task-id and when they generate an external abort, this abort can stop the DMA and the abort handler treats them in the same way by killing the associated task. Each DMA resource, such as DMA engine 214 within DSP subsystem 104 (refer to FIG. 2) or DMA engine 106 (refer to FIG. 1) have an associated task-ID register as illustrated in FIG. 3. These task registers are loaded with a task-ID value to indicate what task is associated with the DMA block that is being transferred by the DMA engine. For system DMA, an associated R-id that identifies the CPU having initiated the DMA enables to redirect the error to its abort handler.

Similarly, co-processors are also provided with a task-ID register that is loaded with a task-ID value so that memory accesses initiated by the co-processor can be associated with a task that is controlling the co-processor.

Figure 7:
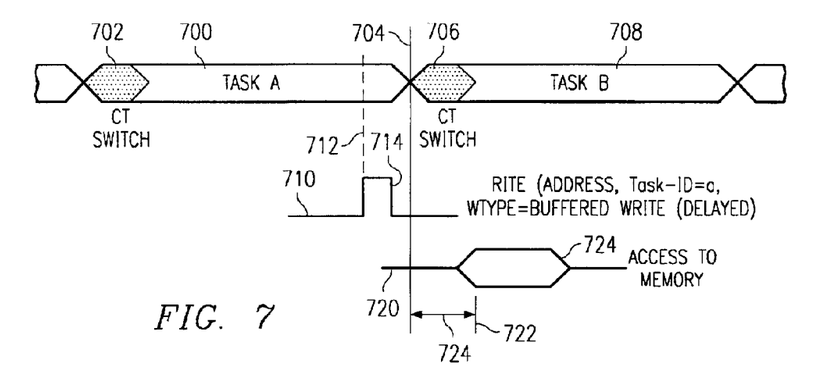
FIG. 7 is a timing diagram illustrating a delayed write operation with task-ID information on the system of FIG. 6.

FIG. 7 is a timing diagram illustrating a delayed write operation on the system of FIG. 6. During time period 700, task A is being executed. A context switch 702 is performed at the beginning of task A and loads task-ID register 670 with a task-ID value representative of task A. At time 704, task A is suspended and task B then begins execution. A context switch 706 is performed at the beginning of task B and loads task-ID register 670 with a task-ID value representative of task B. Task B continues to execute during time period 708.

Towards the end of period 700, task A issues a buffered write request at time 712, indicated as 714. Memory access signals 710 include an access address, task-ID information indicating task A, and type information indicating this is a delayed write. This information is all stored in write buffer 650. Due to the memory access priority arbitration, write request 714 is not actually presented to traffic controller 110 and external memory 112 on signals 720 until time 722, indicated as 724. However, time 722 occurs after context switch time 704, so that if an error occurs in response to memory access request 724 initiated by task A, the error will occur during the execution of task B. Advantageously, if an error does occur, abort-task-ID register 668 is loaded with task-ID information that was queued in write buffer 650 that identifies task A as the source of memory access 724. Abort-task-ID register thus contains a task-ID value that is coherent with a fault address stored in fault address register 664.

Figure 8:
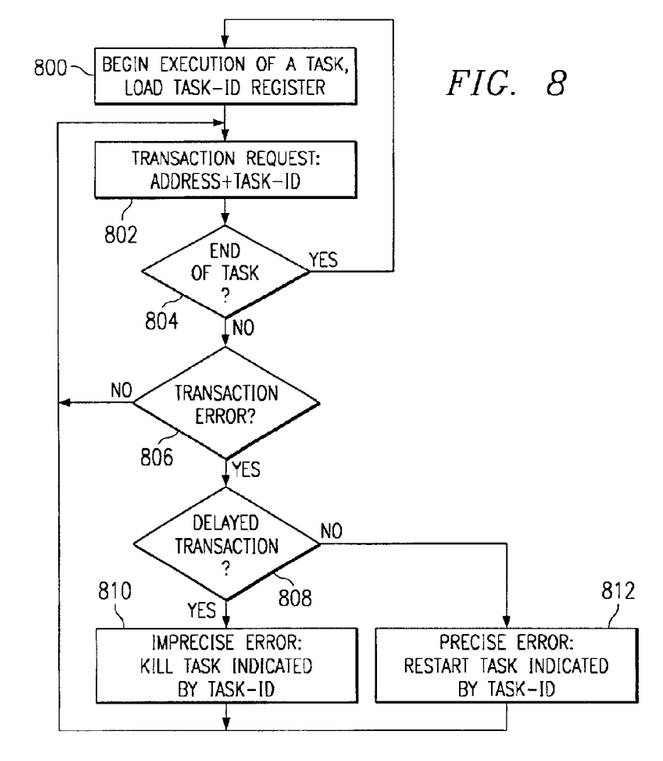
FIG. 8 is a flow chart illustrating a method of transaction error recovery that embodies the present invention.

FIG. 8 is a flow chart illustrating a method of transaction error recovery that embodies the present invention. In step 800, execution of a task begins and the task-ID register is loaded with a value to identify the task.

In step 802, a memory transaction is requested during execution of the task. A transaction address is provided that specifies a memory location to be accessed. The task-ID value from the task-ID register is sent with the transaction address in order to identify the task that requested the transaction.

In step 804, if the task is ended, then step 800 is repeated and another task begins execution and the task-ID register is loaded with a value to identify the new task. Otherwise, the first task continues execution.

Step 806 represents detection of an error condition that prevents normal completion of the memory transaction. An error condition is detected and reported to abort circuitry, as described earlier.

In step 808, if an error condition is detected, it can be classified as either an imprecise error or a precise error. Precise means that the current PC address can easily be recovered to correct the error and start the application if necessary where it fails. Imprecise means that the program cannot be re-started where it fails because the PC address has been lost. In general, if the transaction was delayed, such as in a write buffer or as a DMA block transfer, for example, then a resultant transaction error is imprecise. As described earlier, the type of error can be indicated by a status register or by individual abort signals, for example. For delayed transactions, the task-ID value is queued in buffer circuitry along with the transaction address so that the task-ID value and a fault address are coherent, even if a new task has begun execution before the error is detected.

For an imprecise error, the error condition is handled by a recovery routine using the task-ID value provided with the memory transaction request to identify which program task was the source of the memory transaction request in step 810. The abort handler can immediately identify the task by reading the task-ID that was queued along with the fault address in the buffer circuitry. Advantageously, this allows the operating system to kill a faulty application very rapidly without impacting so much the other tasks and in particular real time tasks.

Similarly, for precise errors in step 812, the task-ID value provided along with the fault address can be used to identify which program task was the source of the memory transaction request. Depending on the embodiment, this may not be particularly useful since the program counter value is also known in a precise error situation. However, in an embodiment having multiple simultaneous threads of execution, the program counter value may not be definitive and the ability to associate a memory transaction error with a particular execution thread is beneficial.

Digital System Embodiment

Figure 9:
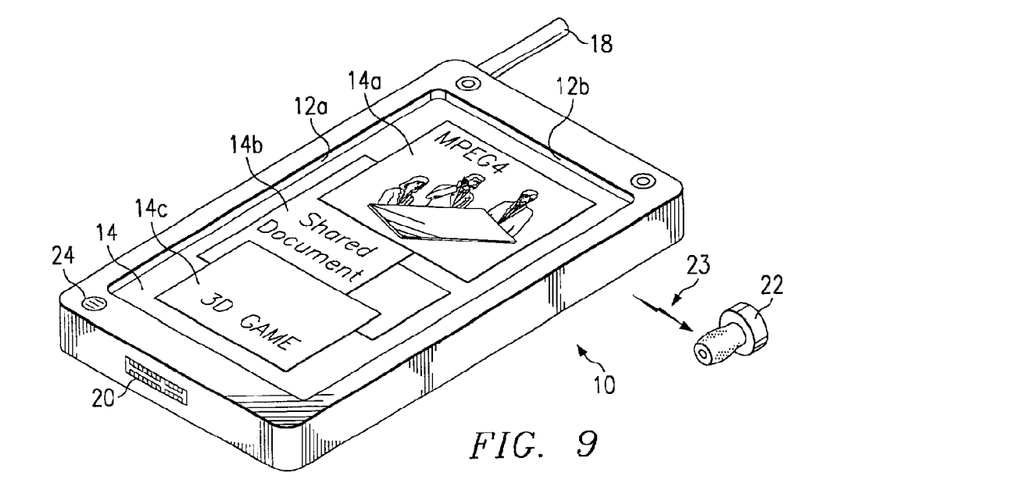
FIG. 9 is a representation of a telecommunications device incorporating an embodiment of the present invention.

FIG. 9 illustrates an exemplary embodiment of such an integrated circuit in a mobile telecommunications device, such as a mobile personal digital assistant (PDA) 10 with display 14 and integrated input sensors 12a, 12b located in the periphery of display 14. As shown in FIG. 9, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to ear piece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link. Various programs may be downloaded over the wireless network to provide additional features and applications. Advantageously, by using task-ID information to recover from memory access errors, an offending task can be isolated and more robust operation of the PDA is provided.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the L1 cache may be a simple cache that does not include RAM-set or configurable features. The cache may be positioned at a level other than L1. The cache may have a different set organization with a different number of segments per line, for example.

Various embodiments may have only a single resource that accesses memory, or a number of resources. Referring again to FIG. 3, the resource-ID value may be provided along with the task-ID value and fault address and collected by abort circuitry to distinguish requests from various resources. A single resource can then monitor transaction requests on a shared bus and direct recovery efforts for transaction errors by using the resource-ID along with the task-ID value value provided with each transaction request.

In a processor that performs multi-thread execution, there may be more than one task register to identify tasks being executed in a parallel manner.

It is therefore contemplated that the appended claims will cover any such modifications of the embodiments as fall within the true scope and spirit of the invention.

What is claimed is:

1. A method of operating a digital system having a processor and a memory, comprising the steps of:

executing a plurality of program tasks on the processor;

requesting a memory transaction responsive to a first one of the plurality of program tasks by providing a transaction address to be accessed and an identifier value indicative of the first program task;

detecting an error condition that prevents normal completion of the memory transaction; and recovering from the error condition by using the identifier value provided with the memory transaction request to identify the first program task as the source of the memory transaction request.

2. The method of claim 1, wherein the identifier value comprises a task identifier value.

3. The method according to claim 1, wherein the identifier value comprises a resource identifier value to identify which resource of a plurality of resources is the source of the memory transaction request.

4. The method according to claim 1, further comprising the step of delaying the memory transaction request such that a second one of the plurality of program tasks is being executed when the error condition is detected.

5. The method according to claim 4, wherein the step of delaying the memory transaction request comprises queuing the identifier value along with the transaction address.

6. The method according to claim 4, wherein the step of delaying the memory transaction comprises keeping the identifier value coherent with an associated delayed memory access.

7. The method according to claim 4, wherein the memory transaction request resulted from a cache load or clean operation.

8. The method of claim 1, wherein the source of the memory transaction request is a direct memory access (DMA) engine.

9. The method of claim 1, wherein the source of the memory transaction request is a co-processor.

10. The method according to claim 1, wherein the step of recovering comprises suspending operation of just the first program task such that a remainder of the plurality of program tasks continue to be executed.

11. A digital system, comprising:

a processor for executing program tasks, the processor having an address output port connected to a memory circuit, the address port operable to provide transaction addresses for memory transactions;

identifier circuitry connected to the processor for holding an identifier value indicative of a program task being executed;

abort circuitry connected to the identifier circuitry and to the address output port, the abort circuitry operable to store a fault address provided on the address output port and an identifier value corresponding to the fault address in response to a memory transaction error; and wherein the processor is connected to the abort circuitry such that the processor is operable to read the stored fault address and the stored identifier value.

12. The digital system of claim 11, further comprising buffer circuitry connected between the address output port and the memory circuit, the buffer circuitry also connected to receive identifier values from the identifier circuitry, the buffer circuitry also having outputs connected to the abort circuitry, wherein the buffer circuitry is operable to queue transaction addresses and corresponding identifier values and to provide them to the abort circuitry after a delay.

13. The digital system according to claim 12 being a personal digital assistant, further comprising:

a display, connected to the processor via a display adapter;

radio frequency (RF) circuitry connected to the processor; and an aerial connected to the RF circuitry.

* * * * *